(12) United States Patent
Jang

(10) Patent No.: US 9,516,296 B2
(45) Date of Patent: *Dec. 6, 2016

(54) SYSTEM AND METHOD FOR EXTRACTING A 3D SHAPE OF A HOT METAL SURFACE

(71) Applicant: DONGGUK UNIVERSITY GYEONGJU CAMPUS INDUSTRY-ACADEMY COOPERATION FOUNDATION, Gyeongju-si, Gyeongsangbuk-do (KR)

(72) Inventor: Yu Jin Jang, Gyeongju-si (KR)

(73) Assignee: Dongguk University Gyeongju Campus Industry-Academy Cooperation Foundation (KR)

( * ) Notice: Subject to any disclaimer, the term of this patent is extended or adjusted under 35 U.S.C. 154(b) by 235 days.

This patent is subject to a terminal disclaimer.

(21) Appl. No.: 14/147,705

(22) Filed: Jan. 6, 2014

(65) Prior Publication Data

US 2014/0118502 A1 May 1, 2014

Related U.S. Application Data

(63) Continuation of application No. PCT/KR2011/005219, filed on Jul. 15, 2011.

(30) Foreign Application Priority Data

Jul. 13, 2011 (KR) .................. 10-2011-0069543

(51) Int. Cl.
*H04N 13/02* (2006.01)
*G01B 11/25* (2006.01)
*G06T 7/00* (2006.01)

(52) U.S. Cl.
CPC ....... *H04N 13/0282* (2013.01); *G01B 11/2509* (2013.01); *G01B 11/2531* (2013.01);
(Continued)

(58) Field of Classification Search
CPC ... C08G 75/02; C08G 75/045; G01B 11/2509; G01B 11/2531; G06T 2207/10024; G06T 2207/10152; G06T 2207/30136; G06T 7/0057; G06T 7/0073; H04N 13/0282
(Continued)

(56) References Cited

U.S. PATENT DOCUMENTS 5,005,147 A * 4/1991 Krishen ............... G06K 9/6293
703/13
5,836,872 A * 11/1998 Kenet .................. A61B 5/0059
382/128
(Continued)

FOREIGN PATENT DOCUMENTS

| JP | 2007-17401 A | 1/2007 |
|---|---|---|
| KR | 10-0239223 B1 | 10/1999 |
| KR | 10-1012691 B1 | 2/2011 |

OTHER PUBLICATIONS

WIPO, International Search Report, PCT/KR2011/005219, May 30, 2012.

*Primary Examiner* — Shan Elahi
(74) *Attorney, Agent, or Firm* — Park & Associates IP Law, P.C.

(57) ABSTRACT

A system for extracting a 3D shape of a hot metal surface, includes: a light source unit emitting four types of light, i.e. two types of light each having different wave bandwidths that are different from a wave bandwidth emitted by a hot target object, and two other types of light having the same wave bandwidths as the above-described two types of light, respectively, so that the types of light having the same bandwidths are polarized in different directions so as not to interfere with one another; an image acquisition unit simultaneously emitting the four types of light, polarized from the light source, onto the target object so as to acquire 2D images of the target object; and an image processing unit (Continued)

using a photometric stereo technique so as to combine the 2D images acquired by the image acquisition unit and extract a 3D shape of the surface of the target object.

7 Claims, 3 Drawing Sheets

(52) U.S. Cl.
CPC .......... *G06T 7/0057* (2013.01); *G06T 7/0073* (2013.01); *G06T 2207/10024* (2013.01); *G06T 2207/10152* (2013.01); *G06T 2207/30136* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 6,273,571 B1* | 8/2001 | Sharp | ................... | G02B 5/3083 348/742 |
| 6,497,540 B1* | 12/2002 | Shikata | ................. | B23C 5/1009 407/53 |
| 2002/0139920 A1* | 10/2002 | Seibel | .................. | A61B 1/0008 250/208.1 |
| 2003/0112507 A1* | 6/2003 | Divelbiss | ............. | G02B 26/008 359/464 |
| 2004/0189957 A1* | 9/2004 | Shpizel | .............. | H04N 13/0459 353/97 |
| 2008/0205052 A1* | 8/2008 | Hayes | ....................... | G01J 1/42 362/231 |
| 2009/0303597 A1* | 12/2009 | Miyawaki | .............. | G02B 27/22 359/559 |
| 2010/0201921 A1* | 8/2010 | Bell | .................... | G02B 27/2221 349/77 |
| 2010/0321704 A1* | 12/2010 | Kawai | .................... | G01B 11/24 356/612 |
| 2011/0134225 A1* | 6/2011 | Saint-Pierre | ........... | G01B 11/03 348/47 |
| 2014/0168382 A1* | 6/2014 | Jang | ..................... | G01B 11/245 348/47 |

\* cited by examiner

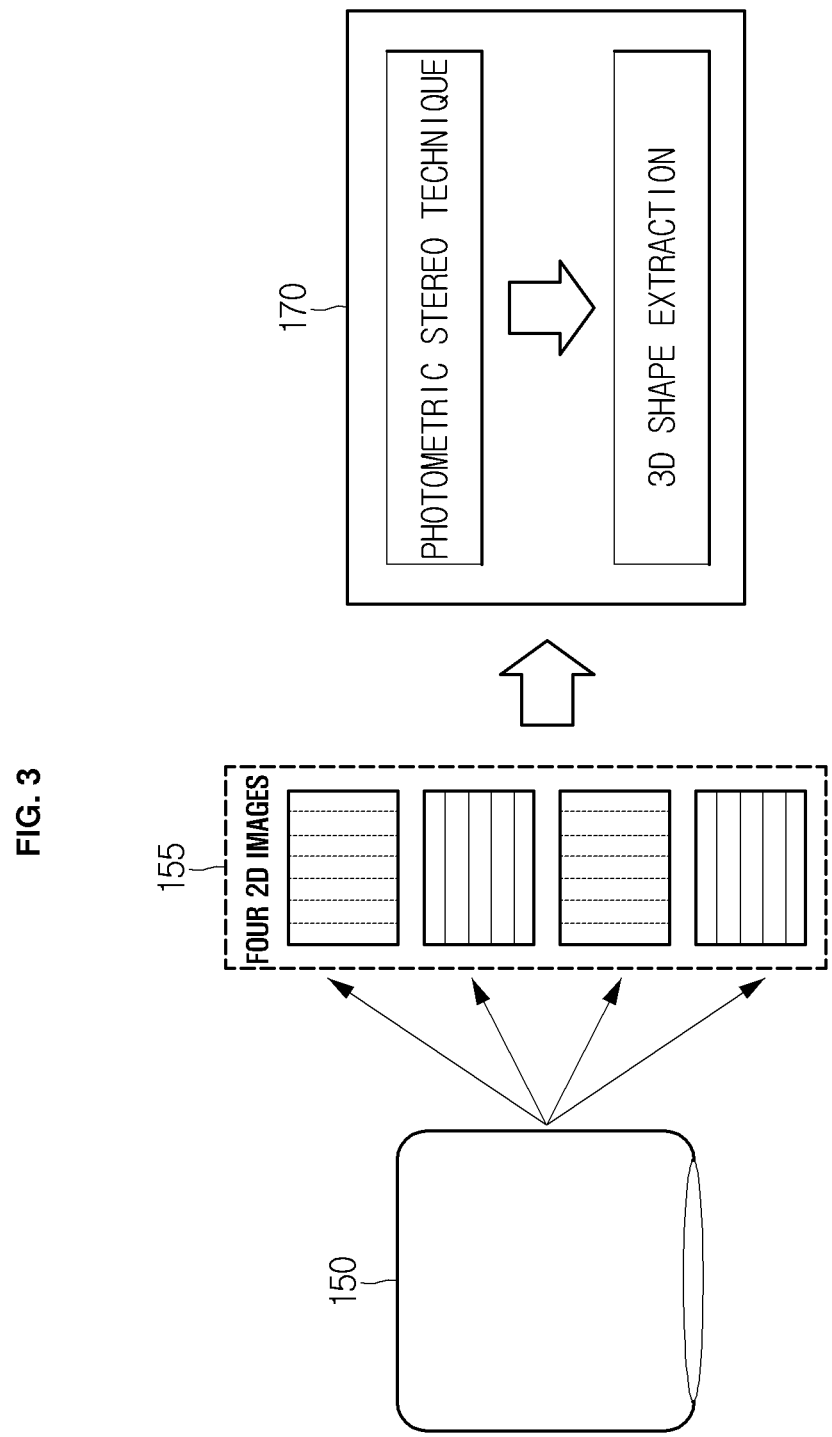

SYSTEM AND METHOD FOR EXTRACTING A 3D SHAPE OF A HOT METAL SURFACE

REFERENCE TO RELATED APPLICATIONS

This is a continuation of pending International Patent Application PCT/KR2011/005219 filed on Jul. 15, 2011, which designates the United States and claims priority of Korean Patent Application No. 10-2011-0069543 filed on Jul. 13, 2011, the entire contents of which are incorporated herein by reference.

FIELD OF THE INVENTION

The present invention relates, in general, to a system and method for extracting the three-dimensional (3D) shape of a high-temperature metal surface and, more particularly, to a system that simultaneously radiates linearly polarized light beams onto a high-temperature metal object and extracts the 3D shape of the surface of the high-temperature metal object using a photometric stereo technique, and to a method of extracting the 3D shape of the surface of the high-temperature metal object using the system.

BACKGROUND OF THE INVENTION

Three-dimensional (3D) shape extraction technology is an important technology for extracting the 3D shape of an object existing in the real world. And it has already been utilized in many application fields. Technology for extracting the 3D shape of an object may be classified into a contact type and a noncontact type, wherein contact-type 3D shape extraction technology may obtain high-precision 3D measurement data in such a way as to measure 3D coordinates from a measurement region of a target to be reconstructed in a state in which measurement sensors touch the measurement region, but an object that is deformed when pressure is applied or a high-temperature object cannot be measured, and thus noncontact-type 3D shape extraction technology has been presented as an alternative of the contact-type technology.

Noncontact-type 3D shape extraction technology is a scheme for extracting a 3D shape using light reflected or transmitted from an object, wherein in various industrial fields, the development of technology related to systems capable of extracting the 3D shape of a product itself or the surface of the object in a noncontact manner and in real time has been continuously required so as to manage the quality of products.

A photometric stereo technique is a technique for sequentially applying a plurality of lighting units to a target object, and extracting the 3D shape of an object using at least three images acquired by a camera, and is capable of more reliably extracting the 3D shape of an object as the number of lighting units is larger.

Recently, a technique has been developed which applies a photometric stereo technique to three images, obtained by simultaneously radiating light components corresponding to three different wavelength bands of R (red), G (green), B (blue) onto the object by using an RGB camera, and then extracts 3D shape information.

However, since a high-temperature metal object may emit light having a wide frequency band ranging from a yellow light region and a red light region to an infrared region, it is impossible to acquire three or more images having the effect of applying at least three light components which are to be applied to the photometric stereo technique, by using only the above method using the above-described RGB camera and the R (Red), G (Green), and Blue (Blue) light components, and thus it is impossible to extract the 3D shape of a high-temperature material at the present time.

In steel industry, it is very important to extract 3D information about defects on the surface of a high-temperature steel material in a stationary or moving state in the production stage of products, and take suitable actions based on the 3D information from the standpoint of quality management and cost reduction. However, to date, a system for extracting the 3D shape information of an object surface in a noncontact manner and in real time in a high-temperature condition in which an object emits light by itself has not yet been developed, and the development of this 3D shape extraction system is urgently required.

SUMMARY OF THE INVENTION

The present invention has been made keeping in mind the above problems occurring in the prior art, and an object of the present invention is to provide a system and method that are capable of extracting the 3D shape of the surface of a high-temperature metal object in a stationary or moving state.

In particular, in steel industries, a plurality of products are produced using a high-temperature steel material which emits light by itself, and the present invention is intended to solve a problem in which the steel material emits high-temperature heat in the production stage of products and then makes it difficult to determine whether a product is defective due to the inaccessibility of the steel material.

Another object of the present invention is to solve a problem in which a high-temperature metal object emits light having a wide frequency band ranging from a yellow light region and a red light region to an infrared region and thus it is impossible to extract the 3D shape of a high-temperature metal object using a conventional 3D shape extraction technique.

In order to accomplish the above objects, the present invention provides a system for extracting a three-dimensional (3D) shape of a high-temperature metal surface, including a light source unit for emitting four non-interfering light beams comprising a first two polarized lights of different wavelength bands and a second two polarized lights of the same wavelength bands as the first two polarized lights, wherein the different wavelength bands are wavelength bands differing from that of light emitted from a high-temperature target metal object; an image acquisition unit for simultaneously radiating the four light beams polarized by the light source unit onto the target metal object, thus acquiring two-dimensional (2D) images of the target metal object from the four light beams, respectively; and an image processing unit for combining the 2D images acquired by the image acquisition unit using a photometric stereo technique, and extracting a 3D shape of a surface of the target metal object.

Preferably, the light source unit may include four light components for emitting two pairs of two light beams having the different wavelength bands; and polarizing filters for polarizing the light beams having identical wavelength bands, emitted from the light components, in different directions.

In this case, the polarizing filters may be linear polarizing filters or circular polarizing filters for orthogonally polarizing the light beams having the identical wavelength bands, and the image acquisition unit may include two cameras, each being configured such that linear polarizing filters are orthogonally arranged, linear polarizing filter parts of circular polarizing filters are orthogonally arranged, or a linear polarizing filter and a linear polarizing filter part of a circular polarizing filter are orthogonally arranged.

Further, the present invention provides a method of extracting a three-dimensional (3D) shape of a high-temperature metal surface, including polarizing light beams having identical wavelength bands in different directions among four non-interfering light beams comprising a first two lights of different wavelength bands and a second two lights of the same wavelength bands as the first two polarized lights, and simultaneously radiating the four non-interfering polarized light beams onto a high-temperature target metal object, wherein the different wavelength bands are wavelength bands differing from that of light emitted from the high-temperature target metal object; acquiring two-dimensional (2D) images of the target metal object onto which the four polarized light beams are radiated, respectively; and combining the acquired 2D images using a photometric stereo technique, and then extracting a 3D shape of a surface of the target metal object.

Preferably, radiating may be configured to orthogonally linearly polarize light components having identical wavelength bands using linear polarizing filters or circular polarizing filters, and radiate linearly polarized light beams onto the high-temperature target object, and acquiring the 2D images may be configured to acquire the 2D images using cameras, each being configured such that linear polarizing filters or circular polarizing filters are arranged to transmit the orthogonally linearly polarized light beams.

In this case, acquiring the 2D images may be configured to acquire four independent 2D images for four respective polarized light beams, and extracting the 3D shape may be configured to combine at least three of the acquired four 2D images using a photometric stereo technique, and then extract the 3D shape of the surface of the target metal object.

According to the present invention, it is possible to provide a system and method that are capable of extracting the 3D shape of the surface of a high-temperature metal object in a stationary or moving state.

In particular, in accordance with the present invention, 3D shape information about surface defects in an inaccessible high-temperate steel product can be provided, so that suitable actions against a defective product or a defective region can be taken in advance based on the 3D shape information, thus this invention can greatly contribute to the quality management of products and reduction of production costs for products.

BRIEF DESCRIPTION OF THE DRAWINGS

FIG. 3 illustrates a relationship between the operations of the image acquisition unit and the image processing unit in the embodiment of FIG. 1 according to the present invention.

DETAILED DESCRIPTION OF THE INVENTION

The present invention relates to a system for extracting the 3D shape of the surface of a high-temperature metal object, which simultaneously radiates linearly polarized light beams, having wavelength bands differing from the wavelength band of light emitted from a high-temperature target metal object, onto a high-temperature metal object, and extracts the 3D shape of the surface of the high-temperature metal object using a photometric stereo technique, and to a method of extracting the 3D shape of the high-temperature metal surface using the system.

Figure 1:
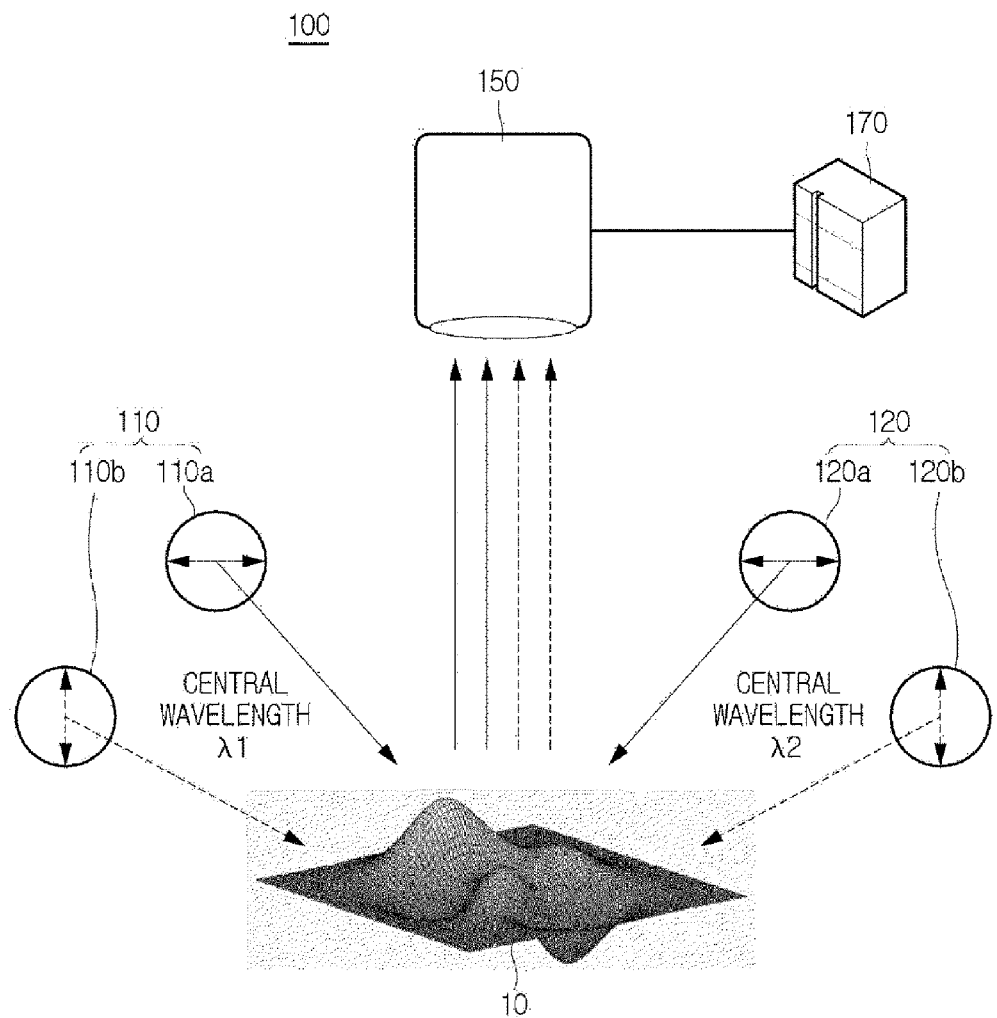
FIG. 1 illustrates the schematic configuration of an embodiment of a system for extracting the 3D shape of a high-temperature metal surface according to the present invention.

FIG. 1 is a diagram showing the schematic configuration of a system for extracting the 3D shape of a high-temperature metal surface according to an embodiment of the present invention.

A system 100 for extracting the 3D shape of a high-temperature metal surface according to the present invention schematically includes light source units 110 and 120 for emitting four non-interfering linearly polarized light beams, an image acquisition unit 150 for radiating the four linearly polarized light beams onto a high-temperature target metal material 10, and acquiring two-dimensional (2D) images, and an image processing unit for combining the acquired images using a photometric stereo technique and extracting the 3D shape of the surface of the target metal material 10.

In the present invention, two light beams having wavelength bands which are different from the wavelength band of light emitted from the high-temperature metal object and which are different from each other are selected. Here, the central wavelengths of the respective selected wavelength bands are assumed to be $\lambda 1$ and $\lambda 2$.

As shown in FIG. 1, a first lighting unit 110 for emitting two light beams having the same central wavelength of $\lambda 1$ and a second lighting unit 120 for emitting two light beams having the same central wavelength of $\lambda 2$ are provided. For the individual light components of the first lighting unit 110 and the second lighting unit 120, linear polarizing filters or circular polarizing filters are arranged, so that the light beams having two different wavelength bands are respectively polarized, and thus a total of four non-interfering light components 110a, 110b, 120a and 120b are configured.

Further, the four non-interfering light components 110a, 110b, 120a, and 120b are radiated onto the high-temperature target metal object 10 to allow the image acquisition unit 150 to acquire 2D images, and the image processing unit 170 combines the images acquired by the image acquisition unit 150 using a photometric stereo technique and extracts the 3D shape of the surface of the target object 10.

In order to describe the present invention, operational advantages of the present invention and objects achieved by the implementation of the present invention, preferred embodiments of the present invention will be illustrated, and the present invention will be described with reference to the embodiments.

First, the terms used in the present application are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

In the following description of the present invention, redundant descriptions and detailed descriptions of known components or functions that may unnecessarily make the gist of the present invention obscure will be omitted.

A photometric stereo technique, one of 3D shape extraction techniques for an object, requires a single fixed camera and images acquired by sequentially radiating at least three light components at different locations onto an object. A recently developed photometric stereo technique is composed of a single RGB camera and light components corresponding to three different wavelength bands of R (red), G (green), and B (blue), and is configured to simultaneously radiate the three light components onto an object and extract a 3D shape using three images having the effect as if three independent light components were sequentially applied.

However, since a high-temperature metal object emits red-based and yellow-based light by itself, it is impossible to acquire an image, made when a red-based light component is radiated onto a high-temperature metal object, to be applied to a photometric stereo technique. Further, since, especially in a process for manufacturing a steel material in steel industry fields, the volumes of steel products are too large, and a production environment is exposed to air and water, a high-temperature steel material that is a target object to be measured has a wide-range temperature distribution, so that the high-temperature steel material emits light having a very wide wavelength band, thus making it impossible to effectively extract a 3D image by applying a conventional 3D shape extraction method to the steel material.

Therefore, the present invention is configured to acquire images using four different light components generated by linearly polarizing light components in two different wavelength bands which are selected to avoid the wavelength band of light radiated when thermal energy is converted into optical energy, to apply a photometric stereo technique to the acquired images, and to extract the 3D shape of a high-temperature metal object.

Hereinafter, the system for extracting the 3D shape of a high-temperature metal surface and a 3D shape extraction method of a high-temperature metal surface using the system according to the present invention will be described together based on a relationship between the operations of components in embodiments.

The embodiment of the above-described system for extracting the 3D shape of the high-temperature metal surface according to the present invention, as shown in FIG. 1, will be described in greater detail below. The two different wavelength bands of the light beams are selected with central wavelength $\lambda 1$ and $\lambda 2$ to avoid the wavelength band of light emitted from a high-temperature metal object according to the present invention. A high-temperature steel material at about 600~1400° C. typically emits light having a wavelength of 600 nm or more even if light having a wavelength of less than 600 nm is also emitted. But the amount of the light having a wavelength of less than 600 nm is excessively small and is negligible.

Further, a typical lighting unit emits light in a wavelength band ranging from 380 to 900 nm which includes a band from a visible region to a near-infrared region. The present invention may select light having a wavelength band ranging from about 380 to 560 nm, as a wavelength band differing from the wavelength band of 600 nm or more of light emitted from the high-temperature steel material.

Although a plurality of light beams may be selected from the range of the wavelength band, if three or more light beams are selected in a situation in which the range of the wavelength band is not wide, the widths of wavelength bands which the respective selected light beams may have are excessively narrow, and the brightness of the light beams is greatly decreased, and thus the light that is too weak to be radiated onto a target object is generated.

Therefore, the present invention is intended to use two light beams having different wavelength bands within the range of 380 to 560 nm so that light beams may be effectively radiated onto the high-temperature object while maintaining suitable brightness.

Preferably, $\lambda 1$ and $\lambda 2$ which are the central wavelengths of the wavelength bands of two light beams may be respectively selected from regions near 420 nm and 520 nm, and thus the wavelength bands which the two light beams can have may be a range of 380~460 nm and a range of 480~560 nm, respectively.

As shown in FIG. 1, the first lighting unit 110 for emitting two light beams having the same central wavelength $\lambda 1$ and the second lighting unit 120 for emitting two light beams having the same central wavelength $\lambda 2$ are provided, and linear polarizing filters and circular polarizing filters are arranged for the light components of each of the first lighting unit 110 and the second lighting unit 120.

A circular polarizing filter is composed of two parts, that is, a linear polarizing filter part and a ¼ wavelength plate part. If the circular polarizing filter is mounted in the corresponding lighting unit, the lighting unit may emit light that is finally linearly polarized after passing through the linear polarizing filter part.

Therefore, light beams that are linearly polarized in different directions may be obtained by installing the linear polarizing filters or the circular polarizing filters on each lighting unit, and the present invention linearly polarizes light beams having the same wavelength band, which are emitted from the lighting unit in orthogonal directions using the linear polarizing filters or the circular polarizing filters.

That is, linear polarizing filters may be orthogonally arranged for two respective light components which are included in the first lighting unit 110 and which have the same central wavelength of $\lambda 1$ or, alternatively, circular polarizing filters may be arranged such that the linear polarizing filter parts thereof are orthogonally arranged, and thus two non-interfering light components, that is, a light component 'A' 110a and a light component 'a' 110b, which are, for example, respectively polarized in horizontal and vertical directions, are generated. Linear polarizing filters may be orthogonally arranged or, alternatively, circular polarizing filters may be arranged such that the linear polarizing filter parts thereof are orthogonally arranged, for two respective light components which are included in the second lighting unit 120 and which have the same central wavelength of $\lambda 2$, and thus two non-interfering light components, that is, a light component 'B' 120a and a light component 'b' 120b, are generated.

In this way, the light component 'A' 110a has only a transverse wave component having a central wavelength of $\lambda 1$ and the light component 'a' 110b has only a longitudinal wave component having a central wavelength of $\lambda 1$. The light component 'B' 120a has only a transverse wave component having a center wavelength of $\lambda 2$ and the light component 'b' 120b has only a longitudinal wave component having a central wavelength of $\lambda 2$.

The light components having two different wavelength bands are respectively polarized via the above configuration, and thus a total of four non-interfering light components 110a, 110b, 120a, and 120b are generated.

Further, as shown in FIG. 1, four non-interfering light components 110a, 110b, 120a, and 120b are radiated onto the high-temperature target metal object 10, so that the image acquisition unit 150 acquires 2D images, and the image processing unit 170 combines the images acquired by the image acquisition unit 150 using a photometric stereo technique and then extracts a 3D shape of the surface of the target object 10.

Figure 2:
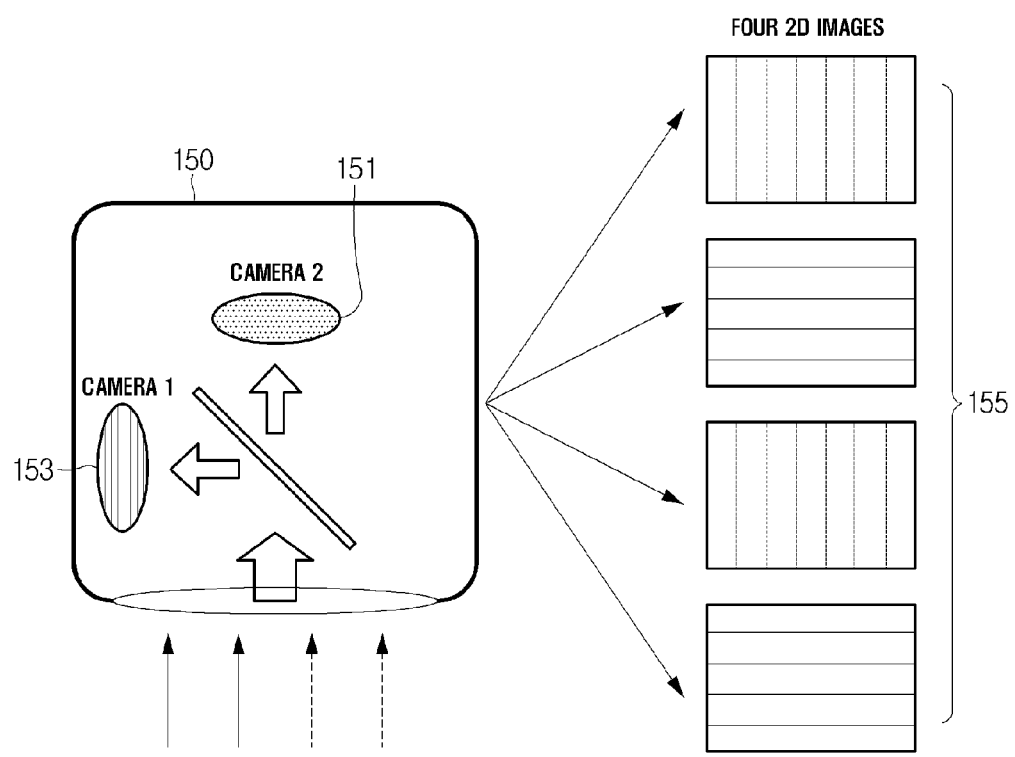
FIG. 2 is a diagram showing the configuration of an image acquisition unit in the embodiment of FIG. 1 according to the present invention.

FIG. 2 is a diagram showing the configuration of the image acquisition unit 150 in the embodiment of FIG. 1 according to the present invention, and the image acquisition unit 150 will be described in detail with reference to FIG. 2.

The image acquisition unit 150 acquires 2D images of the target metal object by simultaneously radiating four linearly polarized light beams 110a, 110b, 120a, and 120b onto the target metal object 10. As shown in FIG. 2, the image acquisition unit 150 includes two cameras 151 and 153, each being configured such that linear polarizing filters are orthogonally arranged, in order to distinguish the orthogonally linearly polarized light beams which are reflected from the metal object.

When a circular polarizing filter is mounted on a camera, light, which is radiated onto the metal object and is reflected from the metal object, first passes through the linear polarizing filter part of the circular polarizing filter and subsequently passes through a ¼ wavelength plate part, and thus the strength of circularly polarized light is sensed by the image sensor of the camera. That is, from the standpoint of image acquisition by the camera, the same effect may be obtained in cases where linear polarizing filters are mounted and where circular polarizing filters are mounted.

In the first camera 153, linear polarizing filters or circular polarizing filters for transmitting light beams, polarized as transverse wave components, are arranged, and then 2D images illuminated by the light component 'A' 110a and the light component 'B' 120a indicative of light beams polarized as transverse wave components are acquired by the first camera 153. Similarly, in the second camera 151, the linear polarizing filters or the circular polarizing filters for transmitting light beams, polarized as longitudinal wave components, are arranged, and thus 2D images illuminated by the light component 'a' 110b and the light component 'b' 120b indicative of light beams polarized as longitudinal wave components are acquired by the second camera 151. That is, when four polarized light beams are simultaneously radiated onto the target metal object 10, the first camera 153 and the second camera 151 acquire four independent 2D images 155 for the respective light components.

The first camera 153 and the second camera 151 may be exemplarily implemented as RGB cameras, each capable of separately capturing three R, G, and B wavelength bands.

FIG. 3 illustrates the operations of the image acquisition unit 150 and the image processing unit 170 in the embodiment of FIG. 1 according to the present invention. Four 2D images 155 acquired by the image acquisition unit 150 are transmitted to the image processing unit 170, and the image processing unit 170 combines at least three of the four acquired images 155 using a photometric stereo technique, and then extracts the 3D shape of the surface of the high-temperature metal object 10.

According to the present invention having the above configuration, four non-interfering linearly polarized light beams are radiated onto a high-temperature target object, and four 2D images are acquired using an image acquisition unit in which optical filters corresponding to four linearly polarized light beams are arranged, with the result that the 3D shape of a target object may be extracted using a photometric stereo technique. Accordingly, since 3D shape information about surface defects in an inaccessible high-temperature steel product can be provided, suitable actions against a defective product or a defective region can be taken in advance based on the 3D shape information, thus this invention can greatly contribute to the quality management of products and reduction of production costs for products.

Although the above description is merely intended to illustratively explain the technical spirit of the present invention, those skilled in the art can implement various changes and modifications, without departing from the essential features of the invention. Therefore, the embodiments described in the present invention are not intended to limit the technical spirit of the present invention and are intended to describe the present invention, and the technical spirit of the invention is not limited to the embodiments. The scope of the present invention should be defined by the accompanying claims, and all technical features falling within the range of the claims and equivalents thereof should be interpreted as being included in the scope of the present invention.

What is claimed is:

1. A system for extracting a three-dimensional (3D) shape of a high-temperature metal surface, comprising:
   a light source device for emitting four non-interfering light beams comprising a first two polarized lights of different wavelength bands and a second two polarized lights of the same wavelength bands as the first two polarized lights, wherein the different wavelength bands are wavelength bands differing from that of light emitted from a high-temperature target metal object;
   an image acquisition device for simultaneously radiating the four light beams polarized by the light source device onto the target metal object, thus acquiring two-dimensional (2D) images of the target metal object from the four light beams, respectively; and
   an image processing device for combining the 2D images acquired by the image acquisition device using a photometric stereo technique, and extracting a 3D shape of a surface of the target metal object.

2. The system of claim 1, wherein the light source device comprises:
   four light components for emitting two pairs of two light beams having the different wavelength bands; and
   polarizing filters for polarizing the light beams having identical wavelength bands, emitted from the light components, in different directions.

3. The system of claim 2, wherein the polarizing filters are linear polarizing filters or circular polarizing filters for orthogonally polarizing the light beams having the identical wavelength bands.

4. The system of claim 3, wherein the image acquisition device comprises two cameras, each being configured such that linear polarizing filters are orthogonally arranged, linear polarizing filter parts of circular polarizing filters are orthogonally arranged, or a linear polarizing filter and a linear polarizing filter part of a circular polarizing filter are orthogonally arranged.

5. A method of extracting a three-dimensional (3D) shape of a high-temperature metal surface, comprising:
   polarizing light beams having identical wavelength bands in different directions among four non-interfering light beams comprising a first two lights of different wavelength bands and a second two lights of the same wavelength bands as the first two lights, and simultaneously radiating the four non-interfering polarized light beams onto a high-temperature target metal object, wherein the different wavelength bands are wavelength bands differing from that of light emitted from the high-temperature target metal object;

acquiring two-dimensional (2D) images of the target metal object onto which the four polarized light beams are radiated, respectively; and combining the acquired 2D images using a photometric stereo technique, and then extracting a 3D shape of a surface of the target metal object.

6. The method of claim 5, wherein:

radiating is configured to orthogonally linearly polarize light components having identical wavelength bands using linear polarizing filters or circular polarizing filters, and radiate linearly polarized light beams onto the high-temperature target object, and acquiring the 2D images is configured to acquire the 2D images using cameras, each being configured such that linear polarizing filters or circular polarizing filters are arranged to transmit the orthogonally linearly polarized light beams.

7. The method of claim 5, wherein:

acquiring the 2D images is configured to acquire four independent 2D images for four respective polarized light beams, and extracting the 3D shape is configured to combine at least three of the acquired four 2D images using a photometric stereo technique, and then extract the 3D shape of the surface of the target metal object.

* * * * *